Nov. 5, 1929.  J. E. HIRST  1,734,090
POWER CONTROLLED RIP SAWING MACHINE
Filed April 9, 1929
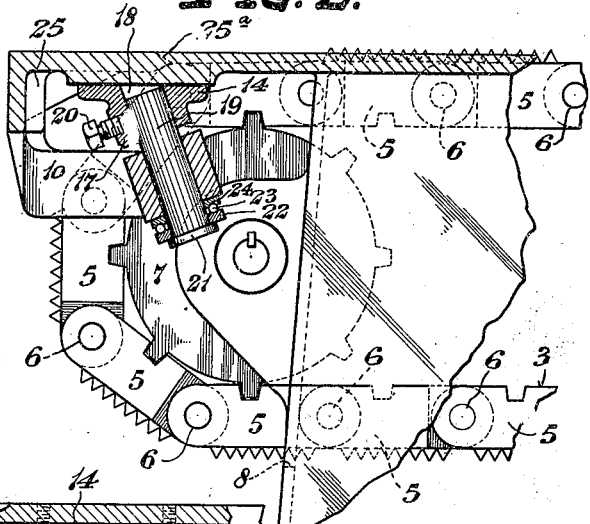
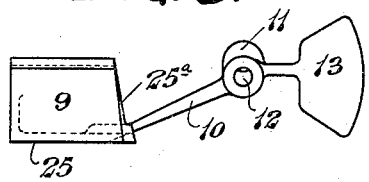
INVENTOR.
James E. Hirst
BY James N. Ramsey
ATTORNEY.

Patented Nov. 5, 1929

1,734,090

UNITED STATES PATENT OFFICE

JAMES E. HIRST, OF CINCINNATI, OHIO, ASSIGNOR TO THE J. A. FAY & EGAN COMPANY, OF CINCINNATI, OHIO, A CORPORATION OF OHIO

POWER CONTROLLED RIP-SAWING MACHINE

Application filed April 9, 1929. Serial No. 353,770.

The present invention relates to power rip sawing machines of the class having an endless chain conveyor to discharge the work therefrom, and more particularly to that portion of the table at the rear end of the machine which is adjacent the chain conveyor to support the work when being discharged.

The object of my invention is to remove a small portion of the machine table, adjacent the chain, and replace it with a yieldably mounted arm, which arm will normally support the work as it is discharged from the machine but which will swing outwardly and downwardly in the event that any portion of the work passing thereover should become caught or jammed such, for instance, as boards having splinters extending therefrom or boards that are warped or contain knots that extend below their lower surface.

Another object of this invention is to provide a yieldably mounted arm, as above described, which will automatically be restored to its normal position after the defective work has been discharged, without the aid of mechanical devices, such, for example, as springs, but will be returned by gravity due to its peculiar construction and mounting upon the machine.

My invention consists in the construction, combination, location and arrangement of parts, as herein fully set forth and claimed.

In the drawing:

Fig. 1 is a rear perspective view of a power driven rip sawing machine shown in broken lines, with the present invention installed thereon and appearing in full lines;

Fig. 2 is a fragmentary vertical sectional view through the rear end of the machine showing the angle of the pivot pin upon which the swinging arm is mounted;

Fig. 3 is a fragmentary end elevation of the table with the invention installed, part of the table appearing in section;

Fig. 4 is a rear end elevational detail of the swinging arm; and

Fig. 5 is a plan view thereof.

Referring to the drawing, the invention is shown as applied to a power driven rip sawing machine, which machine comprises, generally, frame 1, having a way 2 in its top to receive the endless chain conveyor 3, the numeral 4 designating the rear end of the machine, or the end from which the work is discharged.

The chain conveyor 3, as clearly shown in Fig. 2, is composed of links 5, flexibly joined together at 6 and received over the driving sprocket 7, which sprocket is located at the rear end 4 of the machine and driven by any suitable source of power (not shown).

As the chain passes forwardly, within the way 2, and over the driving sprocket 7, it is passed backwardly and within the frame 1, through opening 8, for connection with the idler sprocket (not shown).

In operation of the machine, work is passed therethrough by the chain conveyor 3 and discharged at the rear end 4 of said machine, said work passing over the top surface 9 of arm 10.

Arm 10, as shown in Figs. 4 and 5, is provided with a boss 11, through which a hole 12 is drilled at an angle with reference to the top surface 9, the purpose of which will be explained more fully as the description proceeds. Said arm 10 is also provided with a weighted segment 13, which segment is preferably cast integral with said arm.

Plate 14 (Fig. 3) is mounted beneath table 15 and affixed thereunder by screws 16. Said plate 14 is provided with a downwardly extending neck 17, through which neck and plate a hole 18 extends, for the purpose of receiving the pivot pin 19, as clearly shown in Fig. 2. This pin 19 is held within the hole 18 of neck 17 by a set-screw 20. The lower end of the pivot pin 19 is provided with a flanged head 21, which head supports the lower race 22 of ball-bearing 23, the upper race 24 of said ball-bearing supporting the lower side of the boss 11 and, in turn, the entire weight of arm 10 and segment 13, said pin being passed through the hole 12 in said boss 11. The head 25 of arm 10 normally fits within the opening 26 of table 15, as clearly shown in Figs. 1 and 3, due to the weighted segment 13.

In the event that work, discharging from the machine and passing over the top surface 9 of head 25 should be uneven or engage or strike below the reduced edge 25$^a$ of said head, said head and arm 10 will immediately move outwardly and downwardly, due to the pivotal connection of said arm upon the pivot pin 19, said downward and outward movement of said head being effected by the peculiar angle at which the hole 12 in said arm is drilled and due to the peculiar angle at which the pivot pin 19 is mounted beneath the table 15 of the machine. When any clogging action, as just described, takes place and as the head 25 of arm 10 is forced to move outwardly and away from the opening 26 in the table, the weighted segment 13 is likewise caused to move upwardly towards the top of said table. As soon as the clogging or wedging action has been overcome, due to the removing of head 25 from opening 26, said head is again free to be returned to its normal position within said opening 26, which latter movement of said head is accomplished by gravity due to the weighted segment 13 moving the arm 10 about the pivot pin 19.

With this construction it will be clearly apparent that the head 25 of arm 10 is free to move in a radius about the pivot pin 19 when necessary, due to uneven work, or work having obstructions extending therefrom, striking the inner edge of said head, and it will also be clearly apparent that when the head is moved outwardly, downwardly and from within opening 26 of the table, said uneven work may be readily discharged whereupon the weight of segment 13 will be caused, by gravity, to return said head to its normal position within the opening 26 of the table 15.

In prior power rip sawing machines any work, becoming clogged or caught between the chain conveyor 3 and that portion of the table 15 adjacent the discharged end of the conveyor would necessitate the immediate stopping of the machine to prevent damage thereto, or to the work, or possibly to the workmen operating the machine.

With my improved pivotally mounted arm, however, the above objections have been satisfactorily removed from rip sawing machines, thus avoiding the stopping of the machine while working upon rough or uneven boards.

An advantage of a safety device of this character is the simplicity and economy of parts, there being no springs or other mechanical means to normally hold the head 25 within the opening 26 of the table 15, this movement being satisfactorily accomplished by gravity through the weighted segment 13.

It is to be understood that certain changes and modifications of the invention can be made without departing from the scope or spirit thereof, as defined in the claims.

What I claim as new and desire to secure by Letters Patent is:

1. In a material cutting machine of the class described, the combination of a frame, means for feeding the work to be cut therethrough, a table for said frame having an opening adjacent the rearward end thereof, an arm pivotally mounted beneath said table at an angle thereto and having a head, the upper surface of which is flush with the top of said table, and weighted means carried by said arm for normally supporting said head in the opening of said table.

2. In a material cutting machine of the class described, the combination of a frame, means for feeding the work to be cut therethrough comprising an endless conveyor chain extending horizontally across the top of said frame, thence downwardly over a sprocket wheel and rearwardly therefrom and through the frame, a table for said frame cut away at the rearward end thereof and adjacent said chain, an arm pivotally and angularly mounted beneath said table and having a shelf, the upper surface of which shelf is flush with the upper surface of said table, and means for normally supporting said shelf in the opening of said table, said means comprising a weighted segment integrally attached to said arm.

3. In a material cutting machine of the class described, the combination with a frame, a table, means for feeding the material to be cut, including an endless conveyor chain, the upper portion of which travels horizontally in a way in said table, an arm angularly pivoted beneath the table and including a shelf, an opening in the discharge end of said table to receive said shelf, and a counter-weight carried by said arm to normally support said head within said opening, said head adapted to swing outwardly, downwardly and sidewise simultaneously out of the path of said chain in the event that the material being fed through the machine should become clogged or jammed between said chain and head.

4. In a machine of the class described, including a work table, the combination with a yieldable material support comprising an arm having a shelf integrally formed therewith, an angularly mounted pin fixed beneath said table and upon which said arm is mounted for pivotal movement and a weight cast integral with said arm to normally hold said shelf in flush relation with the top surface of said table and to return it to said flush position in the event it is moved by uneven material, substantially as set forth and for the purposes specified.

5. A swingable support for rip sawing machines of the class described, comprising a horizontal arm, means on one end of said arm to normally support work as it is discharged from said machine and weighted means on the other end of said arm to normally support said first-mentioned means, said second-mentioned means being capable of returning said first-mentioned means to its normal horizontal position in the event it is moved angularly by uneven material passing through said machine.

JAMES E. HIRST.